(12) United States Patent
Yin et al.

(10) Patent No.: US 6,366,596 B1
(45) Date of Patent: Apr. 2, 2002

(54) HIGH POWER LASER

(75) Inventors: Yusong Yin, Stonybrook, NY (US); Peili Chen, Andover, MA (US); Dmitry Donskoy, Oceanside, NY (US)

(73) Assignee: Photonics Industries International, Inc., Bohemia, NY (US)

( * ) Notice: Subject to any disclaimer, the term of this patent is extended or adjusted under 35 U.S.C. 154(b) by 0 days.

(21) Appl. No.: 09/489,123

(22) Filed: Jan. 21, 2000

(51) Int. Cl.⁷ .................................................. H01S 3/08
(52) U.S. Cl. .............................. 372/92; 372/99; 372/71; 372/35; 372/22; 372/93; 372/39
(58) Field of Search .............................. 372/92, 99, 71, 372/34, 22, 93, 35, 27, 30

(56) References Cited

U.S. PATENT DOCUMENTS

| | | | |
|---|---|---|---|
| 5,577,060 A | | 11/1996 | Nighan, Jr. et al. |
| 5,936,984 A | | 8/1999 | Meissner et al. |
| 6,061,370 A | * | 5/2000 | Yin ............................. 271/22 |
| 6,108,356 A | * | 8/2000 | Yin ............................. 372/22 |
| 6,229,829 B1 | * | 5/2001 | Yin ............................. 372/22 |

* cited by examiner

Primary Examiner—Leon Scott, Jr.
(74) Attorney, Agent, or Firm—James A. Quinton, Esq.

(57) ABSTRACT

According to the invention, a high power diode pumped solid state laser is provided. The laser includes a first and second reflective surfaces which form an optical resonator cavity. A laser medium, particularly a Nd doped laser medium for example: a Nd:YAG, a Nd:YLF, or a Nd:YVO₄ crystal is provided within the laser cavity. A fundamental frequency laser beam propagates from the front and back ends of the laser medium. The first reflective surface is highly reflective for fundamental beam. The second reflective surface is at least partially reflective for fundamental beam. The laser medium is end pumped by at least one diode pumping apparatus for example, a laser diode, or diode array, or fiber coupled laser diodes, whose wavelength matches at least one laser medium absorption band. The diode pumping apparatus is located adjacent either the front end or the back end of the laser medium, or both. The optical resonator cavity is configured to provide a laser beam diameter in the laser medium from about 0.8 mm to 2 mm in diameter for the fundamental beam. Desirably, the laser medium has a diameter of about 1.6 to 5 times the fundamental beam diameter in the laser medium. A cooling jacket is desirably provided surrounding the laser medium so that the laser medium is directly liquid cooled. Desirably, the resonator cavity is also configured so that the fundamental beam is operated at TEM00 mode. Preferably, a polarization discriminator for example, a polarizer or one or more Brewster plate is located within the resonator cavity to discriminate one polarization over the other in favor of a particular polarization.

96 Claims, 4 Drawing Sheets

FIG.7a 3 piece Nd:YLiF3 (Nd:YLF) crystal

FIG.7b

3x3x15 mm Nd:YVO4 crystal

FIG.7

HIGH POWER LASER

FIELD OF THE INVENTION

The field of the invention relates to high power diode pumped solid state lasers.

BACKGROUND OF THE INVENTION

In an end pumped laser, the pumping radiation from a pumping laser, a laser diode diode array, or fiber coupled laser diodes is directed through a lens or lens system into the laser medium. Prior art end pumped lasers have been developed using active ions doped crystals such as Nd:YVO4, Nd:YLF and Nd:YAG crystals which can be end pumped from both ends. However, thermal lensing, thermal and stress related birefringence and distortion and crystal fracture have been problems which result in limiting the laser output power from the laser. In order to achieve higher power output from Nd:YAG lasers especially in polarized TEM00 mode beam profile, for example, an external amplifier often was needed(see product offer from Light Solutions and Q-Peak). There have been attempts to address pumping induced thermal and stress caused problems. See U.S. Pat. No. 5,577,060. End pump lasers with undoped ends have been provided, see U.S. Pat. No. 5,936,984. However the power output is still limited. The conventional view has been that the best conversion efficiency and better mode quality is achieved through high brightness pumping. And for high efficiency, compactness and good mode quality, typical laser resonator is limited to 30 cm or less in length with the beam spot size in diameter of 0.6 mm or less. Also, prevailing Nd atomic percentage doping level is about 1%. The same is true for Nd:YLF and Nd:YVO4. Typical diode end pumped laser produces 10 watts or less in polarized TEM00 mode in the case such as Nd:YAG laser. There is still a need for better, more reliable high powered lasers.

Diode pumped solid state lasers have gained popularity over the lamp pumped lasers with high efficiency and compactness, particularly in those applications requiring $TEM_{00}$ mode laser beam. Diode end pumping laser crystals such as Nd:YAG, Nd:YLF and Nd:YV04 have produced the best mode quality and highest efficiency $TEM_{00}$ mode output. Recent advancement of non-linear harmonic generation technologies and harmonic laser applications, such as via hole drilling and laser direct writing, demand high power polarized $TEM_{00}$ solid state lasers with high quality mode profile. In the end pumped configuration, conventional heat removal from the laser crystal pumped by the diodes are called "conductive" cooling (laser crystal is directly mounted to a heat sink). Since only a percentage of the applied pump power is converted into laser radiation, the remaining power is transferred by competing mechanisms as radiationless transition and absorption to the host lattice, resulting in nonuniform heating of the laser medium. To counteract the thermal effects generated by the pump radiation, laser media have to be cooled during operation. Also, mounting the crystal to the heat sink can cause extra mechanical stress on the crystal that is sensitive to environmental and temperature changes. In turn, that will cause the long term instability of the laser operation in a industrial environment. The ensuing nonuniform temperature distribution, stress induced birefringence, thermal and stress induced distortion place a serious limit on the maximum output power at TEM00 mode and beam mode quality. Comprehensive discussions of thermal effects are presented in W. Koechner, Solid State Laser Engineering (Springer Verlag, pp. 393–451). For example, polarized $TEM_{00}$ mode output power of diode end pumped Nd:YAG laser typically is limited to about 10 watts. Higher output power, reliable, stable operation of the laser is critically important for its industrial applications.

SUMMARY OF THE INVENTION

According to the invention, a diode pumped solid state laser is provided which produces improved power output and improved long term stability as well as an improved efficiency of pumping power conversion.

According to the invention, a high power diode pumped solid state laser is provided. The laser includes a first and second reflective surfaces which form an optical resonator cavity. A laser medium, particularly a Nd doped laser medium for example: a Nd:YAG, a Nd:YLF, or a Nd:YVO$_4$ crystal is provided within the laser cavity. A fundamental frequency laser beam propagates from the front and back ends of the laser medium. The first reflective surface is highly reflective for fundamental beam. The second reflective surface is at least partially reflective for fundamental beam. The laser medium is end pumped by at least one diode pumping apparatus for example, a laser diode, or diode array, or fiber coupled laser diodes, whose wavelength matches at least one laser medium absorption band. The diode pumping apparatus is located adjacent either the front end or the back end of the laser medium, or both. The optical resonator cavity is configured to provide a laser beam diameter in the laser medium from about 0.8 mm to 2 mm in diameter for the flndamental beam. Desirably, the laser medium has a diameter of about 1.6 to 5 times the fundamental beam diameter in the laser medium. A cooling jacket is desirably provided surrounding the laser medium so that the laser medium is directly liquid cooled. Desirably, the resonator cavity is also configured so that the fundamental beam is operated at TEM00 mode. Preferably, a polarization discriminator for example, a polarizer or one or more Brewster plate is located within the resonator cavity to discriminate one polarization over the other in favor of a particular polarization.

In another aspect of the invention, Nd doped crystals are used. In particular, low Nd doped Nd:YAG, Nd:YLF, and Nd:YVO$_4$ crystals are used. Multidoped Nd zone crystals can be used or low Nd doped crystal with no or lower doped ends can be used. In a further aspect of the invention, an harmonic generator or nonlinear OPO generator, for example, a second, third and/or fourth harmonic generator or generators, for example a LBO, KTP or BBO crystal or any other suitable nonlinear crystals are provided within the resonator cavity to generate a second, third and/or fourth harmonic beams according to the invention. Such a harmonic laser lasers or intracavity OPO have high power and an improved efficiency and reliability.

Useful in the harmonic generation aspect of this invention are a type I or II phase matching nonlinear crystal for second harmonic generation, type I or type II phase matching crystal for third harmonic generation. In a type I phase matching crystal for second harmonic generation, the fundamental beam is polarized orthogonal to that of resulting second harmonic beam. In a type I matching crystal for third harmonic generation, the fundamental beam and second harmonic beam incident on the type I crystal in parallel polarization to one another and produce a third harmonic beam with perpendicular polarization to the first and second harmonic beams. In a type II phase matching crystal for third harmonic generation, the fundamental beam and second harmonic beam are orthogonally polarized and produce a third harmonic beam with its polarization parallel to the polarization of one of the input beams (for example in a type II LBO crystal the polarization of the fundamental beam (1064 nm) and the third harmonic beam (355 nm) will be parallel). Also useful are 4th harmonic generation crystals. Examples of suitable crystals for harmonic generations include $LiNB_o3$, BaNa (Nb03); $LiO3$, KDP, $KTiOPO4$, $CsLiB6010$, BBO and LBO, preferably KTP, BBO and LBO and CLBO.

It is an object of the invention to provide improved power output of $TEM_{00}$ mode polarized diode end pumped solid state lasers.

It is an object of the invention to provide an efficient end pumped solid state laser with beam spot size in the laser medium from 0.8 mm to 2 mm in diameter and laser crystal diameter of 1.6x to 4x laser beam diameter.

It is an object of the invention to provide a stable and reliable end pumped solid state laser by using improved cooling method.

It is an object of the invention to provide an efficient, reliable end pumped harmonic solid state laser with improved reliability, stability, and efficiency.

It is an object of the invention to provide improved stability and reliability of end pumped Q-switched Nd:YAG laser with stable operation with repetition rate from single pulse to 50kHz.

It is a further object to provide highly efficient, stable, reliable end pumped Q-switched Nd:YAG laser by using low Nd doped YAG crystal having a small diameter of 1.6 to 4 times laser beam diameter in the laser crystal It is an object of the invention to provide an efficient, reliable end pumped solid state laser to produce OPO output with improved reliability, stability, and efficiency.

Other further object will become apparent from the specific drawings and claims.

The preferred embodiment of the present invention is illustrated in the drawings and examples. However, it should be expressly, understood that the present invention should not be limited solely to the illustrative embodiment.

DETAILED DESCRIPTION OF THE INVENTION

According to the invention, a diode end pumped solid state laser is provided which produces improved power output and improved long term stability as well as an improved conversion efficiency from pumping power.

According to the invention, a high power diode end pumped solid state laser is provided. The laser includes first and second reflective surfaces which form an optical resonator cavity. A laser medium, particularly a Nd doped laser medium for example Nd:YAG, Nd:YLF, or $Nd:YVO_4$ crystal is provided within the laser cavity. The laser medium pumped by the pumping laser generates a fundamental frequency laser beam propagating from the front and back ends of the laser medium. The first reflective surface is highly reflective for fundamental beam. The second reflective surface is at least partially reflective for fundamental beam. The laser medium is end pumped by a diode pumping apparatus for example, a laser diode, or diode array, or fiber coupled laser diodes, whose wavelength matches laser medium absorption band, which are located adjacent either the front end or the back end of the laser medium, or both. The optical resonator cavity is configured to provide a laser beam diameter in the laser medium from about 0.8 mm to 2 mm in diameter for the fundamental beam. Desirably, the laser medium has a diameter of about 1.6 to 4 times the fundamental beam diameter in the laser medium. Desirably a cooling jacket is provided surrounding the laser medium so that the laser medium is directly water cooled in the case of Nd:YAG laser. Desirably, the resonator cavity is also configured so that the fundamental beam is operated at TEM00 mode. Preferably, a polarization discriminator for example, a polarizer or a Brewster plate is located within the resonator cavity to discriminate one polarization over the other in favor of a particular polarization.

The invention is desirably used in Nd:YAG lasers. The Nd:YAG lasers of the prior art have suffered from disadvantages such as thermal and stress induced birefringence and distortion, depolarization loss and poor mode quality. Nd:YAG lasers of the prior art were unable to achieve more than 10 watts output power at polarized $TEM_{00}$, Moreover, at 10 watts, the operation of such lasers was unreliable and the power output could vary from day to day partially due to the mechanical mounting induced stress to the Nd:YAG laser crystal. According to the invention, an end pumped Nd:YAG laser that can produce above 10 watts output, preferably, 15 watts or higher, most preferably 20 watts or more with a long term stable operation is provided.

In another aspect of the invention, Nd doped crystals are used. In particular, low Nd doped Nd:YAG, Nd:YLF, and Nd:YVO$_4$ crystals are used. Multi doping level crystals or crystal with no doped ends are provided. Single low Nd doped crystals can also be used.

Typically, Nd:YAG, Nd:YLF, and Nd:YV04 crystals are doped in the prior art at about 1%. According to the invention, the crystals used are preferably low doped, that is for Nd:YAG 0.2% to 0.8% Nd doped; preferably, about 0.4% to about 0.6% Nd doped. For single piece Nd:YLP, the crystals are preferably doped at about 0.3% to about 0.8% Nd, preferably at about 0.4% to 0.7% Nd. For single piece Nd:YVO$_4$, the crystals are preferably low doped at about 0.1 to about 0.5% Nd atomic percentage, preferably at about 0.2% to about 0.4% Nd. These single piece low doped Nd crystals can be used with no doped or lower doped ends also.

In another aspect of the invention, low doped Nd: YAG, Nd:YLF and Nd:YVO4 crystals are used. Total crystal length(single or multi doping zone and/or undoped ends) of Nd:YAG or Nd:YLF is at least 20 mm in length. The total crystal length of Nd:YVO4 (single or multi doping zone and/or undoped ends) is at least 12 mm in length.

In another aspect of the invention, the laser resonator is so designed in order to have a TEM00 mode spot size in the laser medium 0.8 mm to 2.0 mm. The resonator cavity length desirably is 22 cm to 100 cm or greater preferably 35 cm to 100 cm. For resonator design, commercial optics software can be used for example GLAD general laser analysis and design software supplied by Focus Software, Inc. Tucson ,Ariz. Or one can design the resonator according to the ABCD matrix law which is explained by A. Yariv at Optical Electronics. Typical TEM00 mode spot size of diode end pumped solid state lasers has beam spot size of 0.6 mm or less, the resonator length is typically 20 cm or less in the prior art.

In another aspect of the invention, in particular for Nd:YAG crystal, a direct liquid cooling housing is provided. In the prior art in polarized TEM00 mode Nd:YAG lasers, conductive cooling in which the laser crystal is wrapped in a thin indium foil and then directly mounted in the thermal conductive heat sink. The heat sink is cooled either by liquid or air. The crystal diameter is substantially larger than the laser beam spot size in the crystal, for example 6x to 10x larger than the beam spot size.

In another aspect of the invention, Nd doped laser medium such as Nd:YAG, Nd:YLF and Nd:YVO4 crystals has a cross section diameter of 1.6 times to less that 5 times the laser beam diameter in the laser medium.

In another aspect of the invention, a second, third or fourth harmonic or higher laser can be provided. When a second harmonic laser is provided, a second harmonic generator, for example, a type I or type II phase matching non-linear crystal for example, LBO, BBO, KTP crystals are located in the cavity in optical communication with fundamental beam. High optical conversion efficiency to second harmonic beam from the flndamental is provided.

When a third harmonic laser is desired, both a second harmonic generator and a third harmonic generator are located into the cavity in optical communication with the fundamental beam. When a fourth harmonic laser is desired, a second harmonic generator, a third harmonic and a fourth harmonic generator are all located in the cavity in optical communication with a fundamental beam. Such a harmonic laser has an improved efficiency and power.

Useful in the harmonic generation aspect of this invention are a type I or II phase matching nonlinear crystal for second harmonic generation and a type I or type II phase matching crystal for third harmonic generation, and a type I fourth harmonic generation crystal. In a type I phase matching crystal for second harmonic generation, the fundamental beam is polarized orthogonal to that of resulting second harmonic beam. In a type I matching crystal for third harmonic generation, the fundamental beam and second harmonic beam incident on the type I crystal in parallel polarization to one another and produce a third harmonic beam with perpendicular polarization to the first and second harmonic beams. In a type II phase matching crystal for third harmonic generation, the fundamental beam and second harmonic beam are orthogonally polarized and produce a third harmonic beam with its polarization parallel to the polarization of one of the input beams (for example in a type II LBO crystal the polarization of the fundamental beam (1064 nm) and the third harmonic beam (355mn) will be parallel). Also useful are 4th harmonic generation crystals. Examples of suitable crystals include LiNBo3, BaNa (NbO3); LiO3, KDP, KTiOPO4, LBO, BBO, CLBO at al and other periodic poled nonlinear device.

Figure 1:
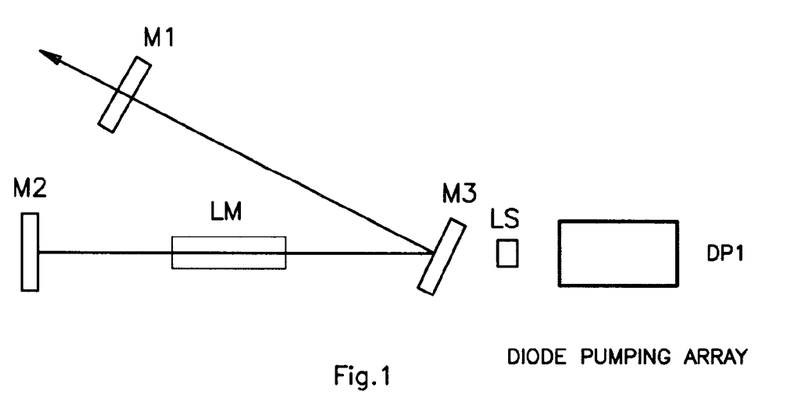
FIG. 1 is a schematic diagram of the diode end pumped laser with the large laser beam spot size in the laser medium LM larger than 0.8 mm in diameter with low active laser ions doping laser medium with single fiber coupled pumping diodes.

In another aspect of the invention, an intracavity optical parametric oscillator can be provided. Type I or type II phase matching non-linear crystal for example, LBO, BBO, KTP or KTA crystals or other OPO nonlinear medium can be used in the cavity in optical communication with fundamental beam. High optical conversion efficiency to OPO output from the fundamental is provided Referring now to figures, FIG. 1 shows an embodiment of the high power laser according to the invention. A resonator cavity is provided between two (2) reflecting surfaces, preferably between reflecting mirrors M1 and M2. Mirror M1 is at least partially reflective for fundamental beam and preferably partially transmissive for fundamental beam to act as the output coupler for the laser. Desirably, mirror M1 is about 85% reflective and 15% transmissive for the fundamental beam produced by the high power laser according to the invention. Also located within the cavity is a reflecting mirror, preferably folding mirror M3, which is located along the optical axis and helps to define the optical axis between mirrors M1 and M2. Mirror M3 is highly reflective for fundamental beam. Laser medium LM is located within the cavity between mirrors M2 and M3. Desirably, mirror M3 is located adjacent to laser medium LM. A diode pumping source DP1 is located in optical communication with mirror M3 to end pump laser medium LM. Laser medium LM is preferably a laser crystal, most preferably a Nd doped laser crystal, desirably a low doped Nd laser crystal particularly a Nd:YLF, Nd:YAG or Nd:YVO$_4$ laser crystal. Mirror M3 is highly reflective for fundamental beam and highly transmissive for the frequency of the diode pump laser source. Mirror M3 is located at an angle to the beam propagating from laser medium LM so that it reflects the beam at an angle to mirror M1 where mirror M1 reflects a portion of the beam back to mirror M3 where it is redirected across the laser medium LM. The resonator cavity is configured to have a laser beam diameter within the laser medium of 0.8 mm to 2 mm. The crystal diameter is 1.6x to 4 times laser beam diameter in the laser medium.

In operation, the front end of the laser medium LM is end pumped by diode pumping source DP1. The laser medium lases and a fundamental beam propagates from the front and back end of LM. The fundamental beam produced by the laser medium is reflected by mirror M2. The beam then is directed back across laser medium LM reflected by mirror M3 to mirror M1 where a portion is removed from the cavity as the output of the laser and a portion is reflected back to mirror M3 to the laser medium LM. The resulting laser has a high power and high degree of stability.

Figure 2:
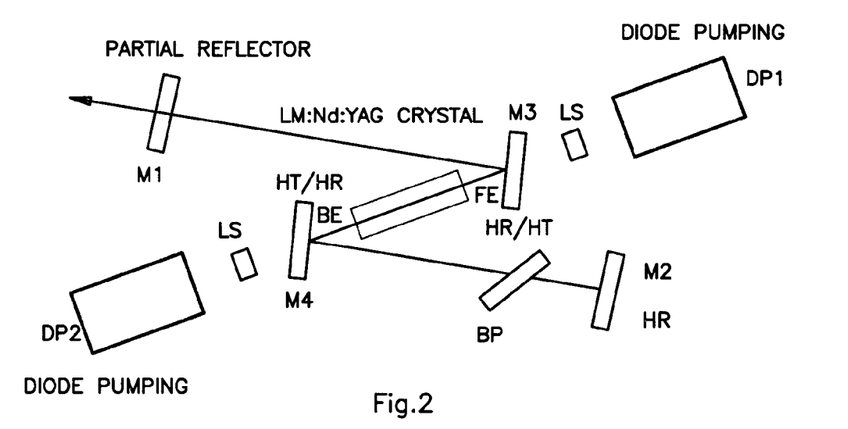
FIG. 2 is a another schematic diagram of the diode end pumped laser with the large laser beam spot size in the laser medium LM larger than 0.8 mm in diameter with low active laser ions doping laser medium with two fiber coupled pumping diodes.

Referring to FIG. 2, which discloses another embodiment of the high power laser according to the invention. As shown in FIG. 2, a resonator cavity is provided between reflecting surfaces, preferably mirrors M1 and M2. Reflecting surface M1 is desirably at least partially reflective for fundamental beam and preferably as shown in FIG. 2 partially transmissive for fundamental beam. Typically an 85% reflection and 15% transmission is desirable although other percentages could be used. Mirror M2 is highly reflective for fundamental beam. A laser medium LM is provided within the optical cavity provided between mirrors M1 and M2. Preferably, laser medium is a Nd:YLF, Nd:YAG or a Nd:YVO$_4$ crystal. Most preferably a Nd:YAG crystal most preferably a low Nd doped Nd:YAG crystal doped to 0.2% to about 0.8% desirably to 0.4% to about 0.6%. Preferably the laser crystal has a diameter of 1.6 to 4 times the fundamental beam diameter in the crystal. A crystal longitudinal axis through the crystal is provided between the crystal's front end FE and its back end BE in the longitudinal direction of the laser crystal. Folding mirrors M3 and M4 are located within the optical cavity provided between mirrors M1 and M2. Mirror M3 is angularly oriented to the crystal longitudinal axis so that the laser beam propagating along the crystal longitudinal axis in the crystal from the front end is reflected away from the laser crystal toward mirror M1 preferably at an acute angle. Mirror M4 is similarly angularly oriented along the longitudinal axis to reflect fundamental beam propagating from the back end BE of the laser medium at an acute angle toward mirror M2. Mirrors M3 and M4 are located adjacent to the laser medium LM. A first diode pumping source DP1 is provided, preferably adjacent to mirror M3. A second diode pumping source DP2 is provided, preferably adjacent to folding mirror M4. Desirably, a polarization discriminator desirably at least one Brewster plate BP is provided between mirrors M2 and M4, or any other location within the resonator if so desired and practical. Polarization discriminator could be for example, a Brewster plate, or other device which provides a polarized beam within the cavity. Mirrors M3 and M4 are highly reflective for fundamental beam and highly transmissive for the frequency of the diode pumping sources. The wavelength of diode sources is specified or adjusted by the cooling temperature to match the absorption band of the laser medium. For example, for Nd:YAG laser crystals, one of the absorption band is about 808 nm, for Nd:YLF laser crystal, it is about 797 nm and another one is about 804 nm, for Nd:YVO4, it is about 808 nm. Alternative absorption band can be used. The resonator cavity is configured to impart a laser beam diameter in the laser medium of from about 0.8 mm to 2.0 mm for the fundamental beam and preferably to operate at polarized TEM00 mode.

Figure 6:
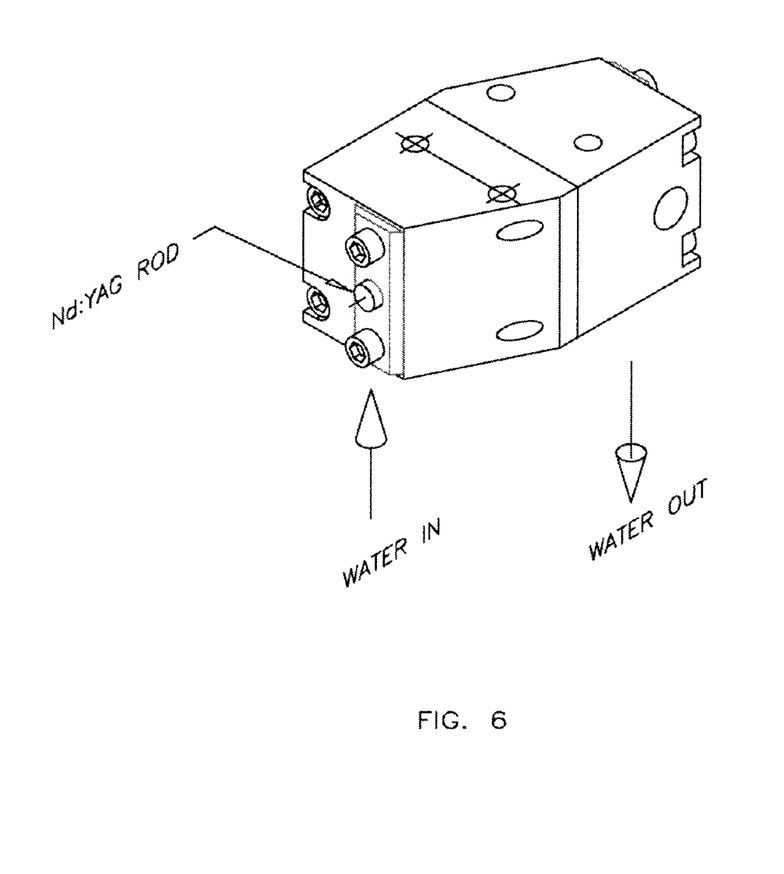
FIG. 6 is a perspective view of the direct liquid-cooled laser medium cell, and the liquid is directly flow through doped LM surfaces without contaminating optical surfaces.

In operation, the diode pumping sources DP1 and DP2 are producing diode laser beam which have the wavelength matching the absorption band of the laser medium. Pumping beams, after passing lens assembly LS, are transmitted by mirrors M4 and M3 and energize the laser medium LM. With proper alignment, the laser lases at a preselected fundamental beam frequency: for example, for a Nd:YAG crystal at a frequency 1064 nm. The fundamental beam propagates from the front end and back end FE and BE of the laser medium and travels along the optical axis where it is reflected by mirror M3 to mirror M1 where a portion of the beam is transmitted and a portion is reflected back to mirror M3 where it is reflected back across the laser crystal; The beam propagating from the back end BE of the laser medium is reflected by mirror M4 through polarization discriminator BP. The beam is then reflected by highly reflective mirror M2. The optical resonator cavity is configured to impart a laser beam diameter in the laser medium preferably a Nd:YAG crystal of from about 0.8 mm to 2.0 mm. The laser medium desirably has a diameter of about 1.6 to 4 times the fundamental beam diameter. A cooling jacket which is best shown in FIG. 6 is provided to directly cool the laser medium, preferably, a Nd:YAG crystal. Desirably, the Nd:YAG crystal LM is doped at a low level from 0.2% to about 8%, preferably about 0.4% to about 0.6%. The laser is preferably operated in the TEM$_{00}$ mode.

EXAMPLE 1

Figure 6A:
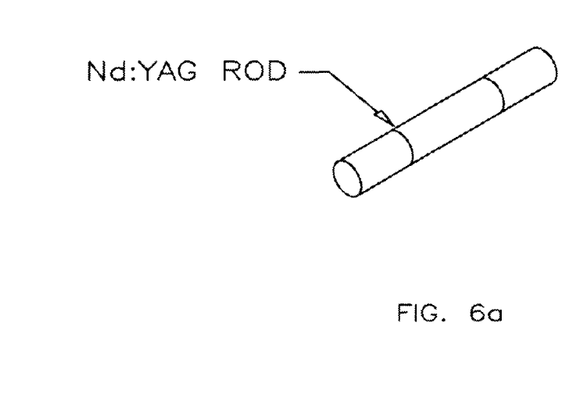
FIG. 6a is a perspective view of the Laser Medium LM, Nd:YAG with lower Nd doping or no doped YAG crystal on both ends. The crystals are diffusion bonded into single crystal from three pieces.

A laser as shown in FIG. 2 was constructed: DP1 and DP2 are 30 watts fiber coupled diode lasers from Coherent Semiconductor Laser Group, Santa Clara, Calif. The output of fiber coupled diode is through single mode fiber with the diameter of 0.8 mm. Through lens assembly LS, 30 watts output from the fiber end at wavelength about 808 nm with 0.2 NA are mirrored into the Nd:YAG laser crystal according to the laser fundamental beam diameter in the laser medium. The imaged diode pumping beam waist is about 1 mm. Laser medium as shown in FIG. 6a included a central portion: 3 mm in diameter ×30 mm long 0.5% Nd doped Nd:YAG crystal, and two ends with 3 mm in diameter 5 mm in length undoped YAG crystals on each end through diffusion bonding(Onyx Optics, Dublin, Calif.). The total crystal length is 40 mm. The YAG crystal was mounted in a water cooled cell as shown in FIG. 6. Two O-rings along with stainless steel plates hold each end of the YAG crystal. All 30 mm in length Nd:YAG crystal portion are directly water cooled. The water flows in from one end and flows out from the other end. The total resonator cavity is about 50 cm in length. The resonator was designed to provide TEM00 mode spot size of about 0.9mm in diameter in the YAG crystal. BP is a thin fused silica oriented at about Brewster angle which acts as a polarization discriminator. M1 is partial reflector with 85% reflection at the laser wavelength of 1064 nm. M2 is a high reflector with 99.9% reflection at 1064 nm. M3 and M4 are coated at high reflection(99.9%) at 1064 nm and high transmission(97%) at 808 nm. The total pumping power to the laser crystal is about 57 watts. The output power at 1064 nm from the laser is 22 watts polarized TEM00 mode power. The conversion efficiency from the pumping power to the polarized TEM00 mode output power is 38.5%. The laser output is stable and reliable.

EXAMPLE 2

As described in example 1, the laser crystal was replaced by a 4 mm in diameter ×30 mm in length with the same 0.5% Nd doping and two 4 mm×5 mm (length) undoped ends. All other description are the same. We achieve 19.0 watts polarized TEM00 mode output. The conversion efficiency is 31.6%. The efficiency is lower than the example 1. The laser output is stable and reliable. The mode quality is excellent although not as good as the example 1.

Figure 3:
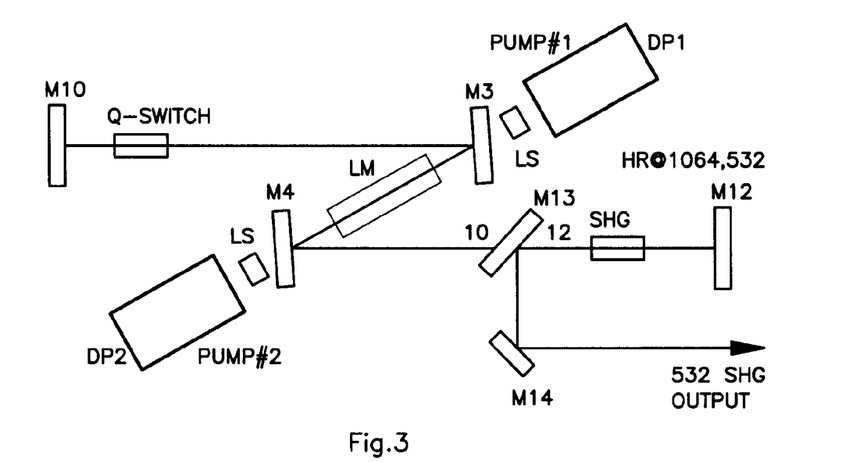
FIG. 3 is a schematic diagram of the diode end pumped second harmonic laser with the large laser beam spot size in the laser medium LM larger than 0.8 mm in diameter with low active laser ions doping laser medium with two fiber coupled pumping diodes.

In another aspect of the invention, harmonic beams can be provided in accordance with the invention. The device according to the invention is particularly suited to produce high power harmonic beam lasers as can be best seen with reference to FIGS. 3, 4, and 5. Referring to FIG. 3, a second harmonic laser is provided. Desirably, the laser medium LM is Nd:YAG, Nd:YLF, or Nd:YV04. A resonator cavity is provided between reflecting surfaces preferably reflecting mirrors M10 and M12. Mirrors M10 and M12 are both highly reflective for fundamental beam, which for a Nd:YAG laser would be 1064 nm. Mirror M12 is also highly reflective for second harmonic beam which for an Nd:YAG laser would be 532 nm. An optional QS switch is provided within the cavity desirably adjacent to mirror M10. Alternatively the QS can be located anywhere in the cavity if so desired, practical, and space allowed. Lens assemblies LS are provided between diode pump source DP1 and folding mirror M3 and between diode pump source DP2 and folding mirror M4. The laser medium LM is pumped in the same manner as described with reference to FIG. 2. The fundamental beam that is reflected from mirror M4 is directed through dichroic mirror M13 which is oriented at or near the Brewster angle for the fundamental beam. Side 10 of M13 is not coated, and side 12 of M13 is coated for high reflection at the second harmonic beam and high transmission at the fundamental beam at "P" polarization. Alternatively, the side 10 of M13 can be coated for high transmission at the fundamental beam at "P" polarization if M13 is oriented other than Brewster angle. As a result, fundamental beam at P-polarization will be favored and "S" polarization will be discriminated. Thus, the laser will operate substantially in P-polarization in the resonator. The fundamental beam is directed across second harmonic generator SHG that is preferably a second harmonic non-linear crystal, for example a LBO or BBO or KTP crystal or other nonlinear SHG generator where a portion of the fundamental beam is converted to second harmonic. The mirror M12 is highly reflective for fundamental and second harmonic beams and reflects both the second harmonic and the fundamental beams back across crystal SHG where a further portion of the fundamental beam is converted to second harmonic. Mirror M13(side 12) is highly reflective for second harmonic and highly transmissive for a fundamental beam propagating from SHG. The second harmonic beam propagating from second harmonic crystal SHG is then reflected by mirror M13 to mirror M14 which is also highly reflective for second harmonic and is directed outside the cavity as the output of the laser. Fundamental beam is transmitted by mirror M13, reflected by mirror M4 and passed again through the laser medium LM for amplification.

EXAMPLE 3

A laser as shown in FIG. 3 was constructed. Referring to example 1 for DP1, DP2, LM, water cooled cell, LS, M3, M4 and resonator. M13 side 12 is coated about 99.5% reflection at 532 nm "S" and about 99.8% transmission at 1064 nm "P" and is oriented at about 56 degree for the incident fundamental and second harmonic beams. M13 side 10 is not coated. The substrate of M13 is fused silica with about 1 mm in thickness. Acoustic-optic Q-switch QS is inserted in the cavity and oriented at Brag angle for laser hold off when cw radio frequency power is on. M13 acts like polarization discriminator which forces the laser operates in fundamental beam at "P" polarization. M10 is high reflector with about 99.9% at 1064 nm. M12 is a high reflector with about 99.9% reflection at both 1064 nm and 532 nm. SHG is second harmonic generation LBO crystal with dimensions of 3 mm ×3 mm in cross section and 10 mm in length. LBO crystal is cut critical phase matching for second harmonic generation for 1064 nm with theta=90 degree and phi=11.4 degree. The total pumping power to the laser crystal Nd:YAG is about 57 watts. The output power at 532 nm from the laser at Q-switched repetition rate of 10 kHz is 15 watts polarized TEM00 mode power with pulse width of 40 ns (FWHM). The second harmonic laser is highly stable and reliable. This laser can operate from single pulse to 50 kHz in repetition rate reliably. In the example 1, if the same A-O q-switch is inserted in the resonator, 15 watts polarized TEM00 mode output at repetition rate of 10 kHz at 1064 nm is achieved with the pulse width about 50 ns (FWHM). The conversion efficiency from the fundamental power to the second harmonic power is about 1 to 1. This is a highly efficient, high power, polarized TEM00 mode direct second harmonic laser. Compared with conventional external second harmonic laser, it is about twice as efficient with better reliability and stability.

Figure 4:
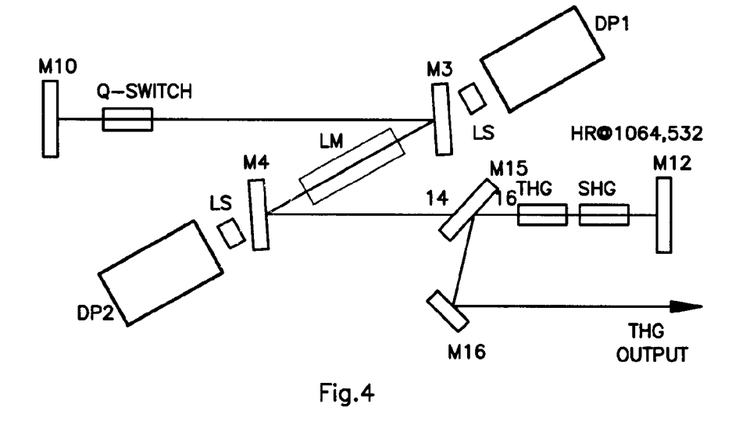
FIG. 4 is a schematic diagram of the diode end pumped third harmonic laser with the large laser beam spot size in the laser medium LM larger than 0.8 mm in diameter with low active laser ions doping laser medium with two fiber coupled pumping diodes.

Referring now to FIG. 4, which is similar to FIG. 3 except a third harmonic beam output is provided. The THG is located between the SHG and beam separator M15. A second harmonic generator for generating second harmonic frequency of the fundamental frequency emitted by the laser, a third harmonic generator for generating third harmonic frequency of the fundamental frequency, are all provided within the cavity.

Useful in this embodiment are a type I phase matching crystal for second harmonic generation and a type II phase matching crystal for third harmonic generation. In a type I phase matching crystal for second harmonic generation, the fundamental beam is polarized perpendicular to the crystals axis (an O or ordinary ray) and the generated second harmonic beam is polarized parallel to the optic axis (an E or and extraordinary beam). In a type II phase matching crystal for third harmonic generation, the fundamental beam and second harmonic beam are orthogonal polarized and produce a third harmonic beam with its polarization of one of two input beams (for example in a type II LBO crystal the polarization of the fundamental beam and the third harmonic beam will be parallel}.

The fundamental beam is reflected by mirror M4 to dichroic mirror M15, which is in optical communication with cavity mirror M12. Between dichroic mirror M15 and mirror M12 is a third harmonic generator THG and a second harmonic generator SHG. In optical communication with dichroic mirror M15 is mirror M16 which is highly reflective for third harmonic beam. In operation, fundamental beam is reflected by mirror M4 where it is directed to dichroic mirror M15 which is highly transmissive for fundamental beam at P-polarization. Dichroic mirror M15 is preferably oriented at or near the Brewster angle to the fundamental beam propagating along the optical axis. Side 14 of M15 is not coated, and side 16 of M15 is coated for high reflection at the third harmonic beam and high transmission at the fundamental beam at "P" polarization. Alternatively, the side 14 of M15 can be coated for high transmission at the fundamental beam at "P" polarization if M15 is oriented other than Brewster angle. As a result, fundamental beam at P-polarization will be favored and "S" polarization will be discriminated. Thus, the laser will operate substantially in P-polarization at the fundamental wavelength. The fundamental beam then passes through third harmonic generator THG which is preferably a third harmonic non-linear crystal, most preferably, a type II LBO crystal. Since a type II THG nonlinear crystal can only convert fundamental beam to third harmonic along with second harmonic beam under the phase matching condition, no third harmonic beam is formed on the first pass of the fundamental beam through the third harmonic generator. The fundamental beam then passes through the second harmonic generator where a portion of the fundamental beam is converted to second harmonic. The second harmonic and fundamental beam are then reflected by mirror M12 back across the second harmonic generator SHG where an additional portion of the fundamental beam is again converted to second harmonic. The fundamental and second harmonic are then directed through third harmonic generator where a portion of the fundamental and second harmonic beams are converted to third harmonic beam. The third harmonic beam is then reflected by dichroic mirror M15 side 16 to mirror M16, which can be a dichroic mirror with high reflection at third harmonic and high transmission at second harmonic, where it is directed outside the cavity as the output. The fundamental beam is transmitted by mirror M15 and directed to mirror M4 where it is passes again through the lasing medium for amplification.

EXAMPLE 4

A laser as shown in FIG. 4 was constructed: Referring to example 3 FIG. 3 for DP1, DP2, LM, water cooled cell, LS, M3, M4, M10, M12, QS, SHG and resonator. M15 side 16 is coated about 99% reflection at 355 nm "P" and about 99.8% "P" transmission at 1064 nm "P" and is oriented at about 56 degree for the incident fundamental, second harmonic and third harmonic beams. M15 side 14 is not coated. The substrate of M15 is fused silica with about 1 mm in thickness. M15 acts like polarization discriminator which forces the laser to operate in fundamental beam at "P" polarization. The total pumping power to the laser crystal Nd:YG is about 57 watts. THG is type II phase match LBO crystal with dimension of 3 mm×3 mm cross section ×15 nm in length. The output power at 355 nm from the laser at Q-switched repetition rate of 10 kHz is 11 watts polarized TEM00 mode power with pulse width of 38 ns (FWHM). The third harmonic laser is highly stable and reliable. This laser can operate from single pulse to 50 kHz in repetition rate reliably. The efficiency to third harmonic output from the fundamental is about 70%. This is a highly efficient, high power, polarized TEM00 mode direct third harmonic laser. Compared with conventional external third harmonic laser, it is more than twice as efficient with better reliability and stability.

A fourth harmonic laser can be provided according to the invention. A second harmonic LBO crystal (cut for either critical phase matching or non-critical phase matching) located within the optical resonator cavity is provided for converting a portion of the fundamental beam to a second harmonic beam. A type II frequency tripling LBO non-linear crystal (cut for critical phase matching) is also located within the laser resonator cavity. The fundamental frequency beam from the laser is directed through the type I frequency doubling crystal within the optical cavity. As a result, a portion of the fundamental beam is converted to a second harmonic beam. The fundamental and second harmonic beams are reflected back through the type I crystal where the fundamental beam is again partially converted to a second harmonic beam prior to any conversion of the second harmonic beam to a higher harmonic beam. The resulting fundamental and second harmonic beams are then directed to a type II frequency tripling LBO non-linear crystal which converts a portion of the fundamental beam and a substantial portion of the second harmonic beam to a third harmonic frequency when both fundamental and second harmonic beams propagate through the frequency tripling crystal. The third harmonic beam and the unconverted fundamental beam are then directed across a type I fourth harmonic LBO crystal cut for critical phase matching where a portion of the fundamental beam and a portion of the third harmonic beam are converted to a fourth harmonic frequency when both fundamental and third harmonic beams propagate through the frequency quadrupling crystal. The resulting beams which are the fundamental, second harmonic, third harmonic and fourth harmonic are then directed to a fourth harmonic separator in which the fourth harmonic beam is separated form the fundamental beam and directed outside the optical resonator cavity as the output of the laser. Optionally, a second uv separator can be placed between the first $4^{th}$ harmonic separator and laser medium LM to block any uv beam through LM. The fundamental beam is then directed back through the laser medium for amplification. Optionally, both the fundamental and the unconverted second harmonic beams can be directed back through the laser medium to increase its efficiency.

Figure 5:
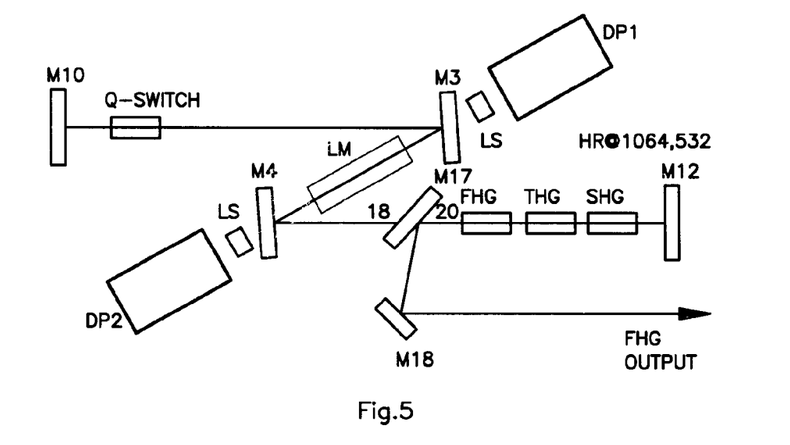
FIG. 5 is a schematic diagram of the diode end pumped intracavity fourth harmonic laser with the large laser beam spot size in the laser medium LM larger than 0.8 mm in diameter with low active laser ions doping laser medium with two fiber coupled pumping diodes.

Referring to FIG. 5, which is similar to FIG. 4 except a fourth harmonic generator FHG is provided between the THG and the beam separator M17. A dichroic mirror M17 is provided between mirror M4 and M12. A fourth harmonic generator is located in optical communication with mirror M17 and mirror M12. A third harmonic generator THG is provided in optical communication with the fourth harmonic generator FHG. A second harmonic SHG generator is provided in optical communication with the third harmonic generator THG. In operation, fundamental beam is directed to dichroic mirror M17 which is highly transmissive for fundamental beam at P-polarization. Dichroic mirror M17 is preferably oriented at or near the Brewster angle to the fundamental beam propagating along the optical axis. Side 18 of M17 is not coated, and side 20 of M17 is coated for high reflection at the fourth harmonic beam and high transmission at the fundamental beam at "P" polarization. Alternatively, the side 18 of M17 can be coated for high transmission at the fundamental beam at "P" polarization if M17 is oriented other than Brewster angle. As a result, fundamental beam at P-polarization will be favored and "S" polarization will be discriminated. Thus, the laser will operate substantially in P-polarization at the fundamental wavelength. Mirror M18 which is highly reflective for fourth harmonic beam is located in optical communication with M17. Optionally, M18 can be a beam separator to separate $4^{th}$ harmonic from $2^{nd}$ and $3^{rd}$ harmonics. The fundamental beam at P-polarization passes through mirror M17 where it incidents on fourth harmonic generator FHG. Fourth harmonic generator FHG, desirably a fourth harmonic generator is preferably a type I LBO fourth harmonic nonlinear crystal which converts a third harmonic beam to fourth harmonic beam in the presence of fundamental beam. The fundamental beam then propagates through the fourth harmonic beam generator FHG where it is unaffected. The fundamental beam then propagates through the third harmonic generator where it is also unaffected. It then passes the second harmonic generator SHG where a portion of fundamental beam is converted to second harmonic. The second harmonic and fundamental beam are then reflected by mirror M12 for a second pass through the second harmonic generator where an additional portion of fundamental beam is converted to a second harmonic beam. The second harmonic and fundamental beams then pass through the third harmonic generator where a portion of the fundamental and second harmonic are converted to third harmonic. The beams propagating form the third harmonic generator are then directed across the fourth harmonic generator where a portion of the third harmonic and the fundamental beams are converted to fourth harmonic beam. The beams then propagate to mirror M17 where the fundamental beam is transmitted back to the laser medium for amplification. The fourth harmonic beam is reflected by mirrors M17 and M18 and directed outside the cavity. For a further and detailed discussion of fourth harmonic generation see applicant's application serial number 277,394 filed on Mar. 16, 1999 entitled Fourth Harmonic Generation Apparatus which is hereby incorporated herein by reference.

Referring to FIG. 6, direct water-cooled LM cell is provided. Alternatively, other cooling liquids can be used. The crystal is 0.5% Nd doped Nd:YAG 30 mm long with 5 mm long undoped end on each side. The diameter of the crystal is 3 mm. Alternatively, undoped ends can be replaced by low doped Nd:YAG crystal such as those with doping level at about 0.1%. The crystal is diffusion bonded by Onyx Optics, Dublin, Calif. All surface except optical facets 0.5% Nd doped YAG crystal along optical axis is directly water-cooled. The water comes in from one end and exits from the other end. O-ring and stainless plate holds and seals undoped or about 0.1% doped YAG crystal end. Water input port and exit ports are not shown(underneath). Two optical crystal facets are anti-reflection coated for both laser wavelength and the pumping wavelength. Through water cooled cell, mechanical mounting stress associated with conductive cooling is eliminated. For Nd:YAG laser, it has been particularly important since mechanical stress in addition to thermal induced stress results unreliable operation for high efficiency, high power polarized TEM00 mode laser. Also, low doping has produced surprising excellent result which is in contradiction with conventional view in which high coupling efficiency, high absorption of pumping power is sought. Smaller crystal diameter also produces higher power output and better stability. Similar arrangement of cooling, low doping and smaller diameter of laser crystal also improves output power, efficiency, and reliability for Nd:YVO4 and Nd:YLF.

Figures 7, 7A, 7B:
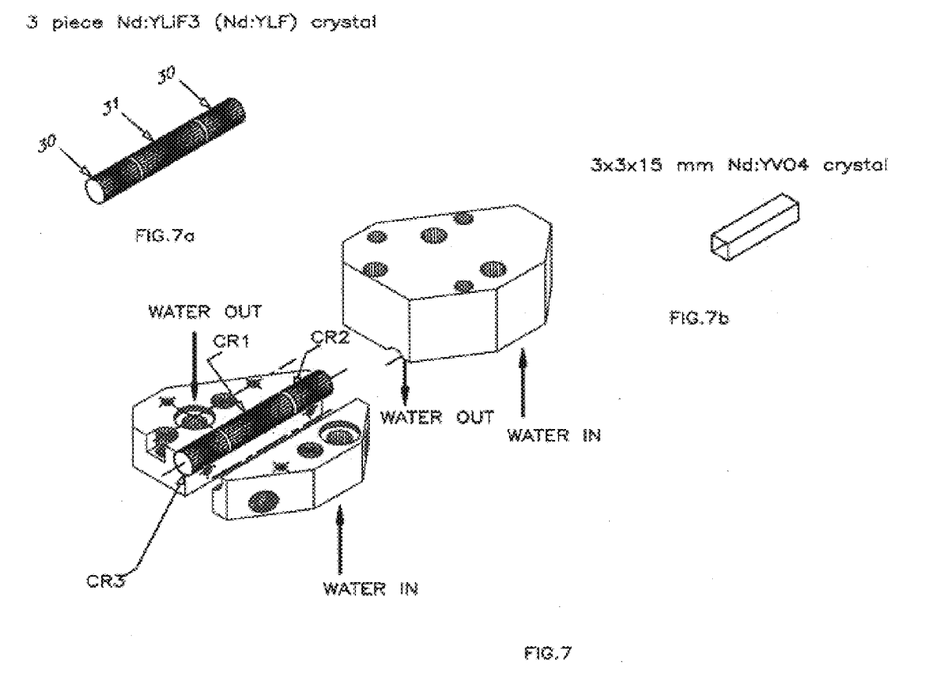
FIG. 7 is a perspective view of the thermal conductively cooled laser medium cell, and the cell is cooled by flowing water in from one end and exiting from the other end.
FIG. 7a is a perspective view of the Laser Medium LM, Nd:YLF with lower Nd doping or no doped YLF crystal on both ends. Higher doped Nd:YLF crystal is located in the center.
FIG. 7b is a perspective view of the Laser Medium LM, Nd:YVO with low Nd doping

Referring to FIG. 7 and 7a, the conductive cooling cell is provided. Three piece Nd:YLF crystals are provided. Crystal 30 is Nd 0.4% Nd doped with dimensions of 4 mm in diameter ×7 mm in length. Crystal 31 is Nd 1% doped with dimensions of 4 mm in diameter ×20 mm in length. Three pieces are aligned up along "c" axis and are wrapped by 125 microns thick indium foil. Indium wrapped three pieces Nd:YLF crystals is directly mounted in the copper cell. The copper cell was cooled by flowing water. Now referring to FIG. 3, Nd:YLF laser was constructed. The laser fundamental beam spot size was designed to be about 1.0 mm in diameter. The total pumping power from two 30 watts fiber coupled diodes was 57 watts. The second harmonic TEM00 mode output power was about 14 watts at 3 kHz in repetition rate. Its fundamental continuous wave output power has been measured to be 23 watts in polarized TEM00 mode. Its conversion efficiency is about 40% from its pumping power. The pumping power has a center wavelength of about 804 nm. The laser is highly reliable and efficient.

Again referring to FIG. 7 and FIG. 1, single fiber coupled diode pumping laser(30 watts version from Coherent, Santa Clara, Calif.) was used to pump Nd:YV04 laser. In this case, the center wavelength of the pumping diode is about 808 nm. The laser beam spot size was designed to be about 0.9 mm in diameter. 0.3% doped Nd:YVO4 crystal with dimension of 3 mm ×3 mm cross section and 15 mm in length was wrapped in a 100 microns thick indium foil. Indium foil wrapped Nd:YVO4 crystal was directly mounted in the conductive cooled copper cell as shown in FIG. 7. The cell was cooled by flowing water from one end and exiting from the other end. With 29 watts pumping power, 14.5 watt polarized TEM00 mode was achieved. The conversion efficiency is 50%. When the laser is A-O q-switched, it produces 11 watts TEM00 mode polarized average power output at 20 kHz repetition rate with the pulse width (FWHM) of 30 ns. With second harmonic resonator referring FIG.3, 11 watts TEM00 mode polarized second harmonic at 532 nm output power at 20 kHz with 25 ns pulse width has been achieved. The conversion efficiency from the fundamental to the second harmonic is again 1 to 1. This is a highly efficient, stable laser.

The laser crystal according to the invention is preferably directly water-cooled, particularly for Nd:YAG high power at polarized TEM00 mode, high efficiency laser. Preferably, the laser medium is low doped as described above. A cooling jacket desirably is provided to provide direct water contact with the laser medium preferably, a laser crystal, most preferably, an Nd:YAG rod or bar. Desirably, the Nd:YAG rod has low Nd doping from 0.2% to 0.8%, or multiple zones of Nd doping. In the case of multi doping zones, desirably, the doping level increases as the distance from the pump laser is increased. Laser crystal as described in the U.S. Pat. No. 080,328 filed on May 5, 1998 which is herein incorporated by reference are particularly useful. Desirably, the laser medium has a preselected lower doping level at the end or ends adjacent to the pumping laser in the case of multi-zones. The doping level increases as the distance from the pump lasers is increased. Preferably, the lasing medium has at least two (2) zones having different levels of doped laser active ion in the two (2) zones. The first zone has a preselected level of doped laser active ions. The second zone located between the first zone and first pumping laser has a lower doped level of laser active ions than the first zone. Desirably, the level of doping in the second zone is from 5% to 70% of the level of doping in the first zone. When the laser is pumped from both ends, the lasing medium preferably includes a third zone and a second pumping laser. The third zone has a lower level of doped laser active ions than the first zone. Desirably, the level of doping in third zone is from 5% to 70% of the level of doping in the first zone. In liquid cooled cell, lower doped ends can be no active ions doped alternatively.

A three zone Nd:YAG is shown in FIG. 6a. The central zone is doped at about 0.4% to 0.6% and the zone near the pump laser is doped about 0.1% to about 0.2%, preferably about 0.1%. Alternatively, three zone Nd:YAG crystal can be provided preferably doped at a central zone about 0.3% to 0.8%, preferably about 0.4% to 0.6%. Undoped zones can be provided on either side also. The undoped or lower Nd doped zones are used to contract the cooling jacket and to hold the laser rod in place. Since the intensity of the diode pumping laser is greatest at the end, the use of the undoped or lower Nd doped crystal on the end and reduce thermal stress in the crystal and makes for a more uniform thermal profile.

Figure 8:
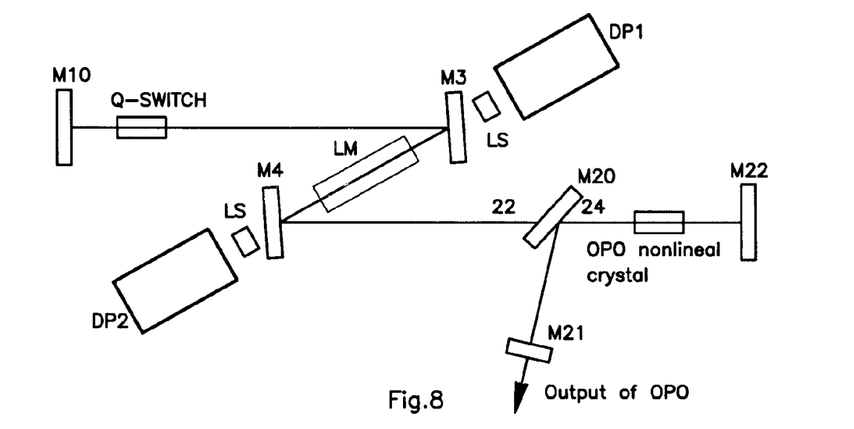
FIG. 8 is a schematic diagram of the diode end pumped intracavity OPO laser with the large laser beam spot size in the laser medium LM larger than 0.8 mm in diameter with low active laser ions doping laser medium with two fiber coupled pumping diodes.

In another aspect of the invention, intracavity optical parametric oscillator is provided according to the invention. The device according to the invention is particularly suited to produce high power OPO output which can be best seen with reference to FIG. 8. Refer to FIG. 3 for resonator design, M10, QS, M3, M4, DP1, DP2, LS. Desirably, the laser medium LM is Nd:YAG, Nd:YLF, or Nd:YV04. A resonator cavity is provided between reflecting surfaces preferably reflecting mirrors M10 and M22. Mirrors M10 and M22 are both highly reflective for fundamental beam, which for a Nd:YAG laser would be 1064 nm. Mirror M22 is also highly reflective for preselected signal wave of OPO and transmissive for idler wave, one of the example is the idler wave is 2602 nm, and signal is 1800 nm. Alternatively, M22 can be partially reflective for signal wave and used as the output coupler for the OPO. An optional QS switch is provided within the cavity desirably adjacent to mirror M10. Alternatively the QS can be located anywhere in the cavity if so desired, practical and space allowed. The fundamental beam that is reflected from mirror M4 is directed through dichroic mirror M20 which is oriented at or near the Brewster angle for the fundamental beam. Side 22 of M20 is not coated, and side 24 of M20 is coated for high reflection at the signal wavelength and high transmission at the fundamental beam at "P" polarization. Alternatively, the side 22 of M20 can be coated for high transmission at the fundamental beam at "P" polarization if M20 is oriented other than Brewster angle. As a result, fundamental beam at P-polarization will be favored and "S" polarization will be discriminated. Thus, the laser will operate substantially in P-polarization in the resonator. The mirror M21 is partially reflective and partial transmissive for the signal wave and transmissive for idler wave. OPO resonator is formed between M21 and mirror M22. The fundamental beam is directed across nonlinear OPO generator that is preferably a non-linear crystal, for example a LBO or BBO or KTP or KTA crystal or any other suitable crystal, where a portion of the fundamental beam is converted to signal and idler waves under the condition of phase matching where laser fundamental frequency=signal wave frequency+idler wave frequency. Either nonlinear crystal angle or crystal temperature can be controlled to control the output signal frequency. The laser fundamental and OPO signal wave beams are reflected back to the nonlinear OPO crystal where a further portion of the fundamental beam is converted to signal wave and idler wave. The laser fundamental beam passes through M20 to the laser medium LM for further amplification. The signal wave will be oscillated between M21 and M22 and produces the output through the output coupler M21. The laser fundamental beam acts as the pumping beam for the OPO. In this arrangement, there will be no wasted fundamental laser beam. The OPO is highly efficient. For a detailed discussion of OPO cavities useful in the invention see: Intracavity Optical Parametric Oscillators, Ser. No. 09/264, 181 which was filed on Mar. 5, 1999 which is hereby incorporated by reference.

The foregoing is considered as illustrative only to the principles of the invention. Further, since numerous changes and modification will occur to those skilled in the art, it is not desired to limit the invention to the exact construction and operation shown and described above, and accordingly all suitable modifications and equivalents may be resorted to, falling within the scope of the invention.

What is claimed is:

1. A laser comprising;
  a) a fist reflective surface and a second reflective surface forming an optical resonator cavity therebetween;
  b) said optical resonator cavity having an optical axis between said first and second reflective surfaces;
  c) a laser medium having a front and back end located within said optical resonator cavity along said optical axis for generating a fundamental frequency laser beam propagating from said front and back end of said laser medium;
  d) said first reflective surface highly reflective for fundamental beam;
  said second reflective surface at least partially reflective for fundamental beam;
  e) a first diode end pumping apparatus for pumping the front end of said laser medium;
  f) said optical resonator cavity configured to impart a laser beam diameter in the laser medium from about 0.8 mm to 2.0 mm in diameter for said fundamental beam; and
  g) said laser medium having a diameter from about 1.6 to 5 times said fudamental laser beam diameter.

2. The laser according to claim 1 further comprising a cooling jacket surrounding said laser medium so that said laser medium is directly water cooled.

3. The laser according to claim 2 wherein said laser medium has a diameter from about 1.6 to 4.0 times said laser beam diameter.

4. The laser according to claim 3 wherein said optical resonator cavity is configured to operate at TEM$_{00}$ mode.

5. The laser according to claim 4 further comprising a polarization discriminator located within said optical resonator cavity.

6. The laser according to claim 1 wherein said laser crystal is a Nd doped laser crystal.

7. The laser according to claim 1 wherein said laser crystal is Nd:YAG doped at about 0.2% to about 0.8%.

8. The laser according to claim 7 further comprising said laser crystal has a length of at least 20 mm.

9. The laser according to claim 1 wherein said laser crystal is Nd:YAG doped at about 0.4% to about 0.6%.

10. The laser according to claim 1 wherein said laser crystal is Nd:YLF doped at about 0.3% to 0.8%.

11. The laser according to claim 10 further comprising said laser crystal has a length of at least 20 mm.

12. The laser according to claim 10 wherein said laser crystal is Nd:YLF doped at about 0.4% to about 0.7%.

13. The laser according to claim 1 wherein said laser crystal is Nd:YVO$_4$ doped at about 0.1% to about 0.5%.

14. The laser according to claim 13 wherein said laser crystal has a length of at least 12 mm.

15. The laser according to claim 1 wherein said laser crystal is Nd:YVO$_4$ doped at about 0.2% to about 0.4%.

16. The laser according to claim 1 wherein the optical resonator cavity length is about 22 cm to about 100 cm.

17. The laser according to claim 16 wherein said laser crystal is a Nd doped laser crystal.

18. The laser according to claim 1 wherein the optical resonator cavity length is about 35 cm to about 100 cm.

19. The laser according to claim 1 wherein the optical resonator cavity length is about 35 cm to about 100 cm.

20. A laser comprising;
  a) a first mirror and a second mirror forming an optical resonator cavity there between;
  b) said optical resonator cavity having an optical axis between said first and second mirrors;
  c) a laser crystal having a front and back end located within said optical resonator cavity along said optical axis for generating a fundamental frequency laser beam propagating from the front and back end of said crystal; said laser crystal having a longitudinal axis through said crystal connecting said front and back ends;
  d) a third mirror located adjacent the front end of said laser crystal along said optical as within said resonator cavity and located along said longitudinal axis;
  e) said first mirror highly reflective for fundamental beam and said first mirror spaced apart from said longitudinal axis;
  said second mirror at least partially reflective for fundamental beam;
  f) a first diode end pumping apparatus for pumping the front end of said crystal;
  said first diode end pumping apparatus located adjacent said third mirror;

g) said third mirror highly reflective for fundamental beam and highly transmissive for pump frequency beam; said third mirror oriented at an angle to said optical axis to reflect said fundamental beam away from said laser crystal to said first mirror;

h) said optical resonator cavity configured to impart a laser beam diameter in the laser crystal from about 0.8 mm to about 2.0 mm in diameter for said fundamental beam;

i) said laser crystal having a diameter of from about 1.6 to 5 times said fundamental laser beam diameter.

21. The laser according to claim 20 further comprising a cooling jacket surrounding said laser crystal so that said laser crystal is directly water cooled.

22. The laser according to claim 21 wherein said resonator cavity is configured to operate at TEM00 mode.

23. The laser according to claim 20 further comprising:
a polarization discriminator located within said resonator cavity.

24. The laser according to claim 23 wherein said polarization discriminator is a Brewster plate.

25. The laser according to claim 20 further comprising:
a fourth mirror located adjacent the back end of said laser crystal along said optical axis within said optical resonator cavity and along said crystal axis;

a second diode end pumping apparatus for generating said pump frequency laser beam; said second diode end pumping apparatus located adjacent said fourth mirror;

said fourth mirror highly reflective for fundamental beam and highly transmissive for pump frequency beam;

said fourth mirror located at an angle to said longitudinal axis to reflect said fundamental beam away from said laser crystal to said second mirror;

said second mirror spaced apart from said longitudinal axis.

26. The laser according to claim 20 wherein said laser crystal is Nd:YAG doped at about 0.2% to about 0.8%.

27. The laser according to claim 26 further comprising said laser crystal has a length of at least 20 mm.

28. The laser according to claim 20 wherein said laser crystal is Nd:YAG doped at about 0.4% to about 0.6%.

29. The laser according to claim 20 wherein said laser crystal is Nd:YLF doped at about 0.3% to 0.8%.

30. The laser according to claim 29 further comprising said laser crystal has a length of at least 20 mm.

31. The laser according to claim 20 wherein said laser crystal is Nd:YLF doped at about 0.4% to about 0.7%.

32. The laser according to claim 20 wherein said laser crystal is Nd:YVO$_4$ doped at about 0.1% to 0.5%.

33. The laser according to claim 32 wherein said laser crystal has a length of at least 12 mm.

34. The laser according to claim 20 wherein said laser crystal is Nd:YVO$_4$ doped at about 0.2% to about 0.4%.

35. The laser according to claim 20 wherein the optical resonator cavity length is 22 cm to 100 cm.

36. A second harmonic laser comprising
a) a first reflective surface and a second reflective surface to form an optical resonator cavity therebetween;
said optical resonator cavity having an optical axis between said first and second reflective surfaces;

b) a laser medium located within said cavity for generating a fundamental frequency beam of electromagnetic radiation (EMR) having a first preselected wavelength propagating from the front end and the back end of said laser medium;

c) a second harmonic generator converting a portion of said EMR of said first preselected fundamental wavelength beam to a second harmonic beam in optical communication with said front end of said laser medium;

d) said second harmonic generator having a first EMR port for receiving and directing radiation trough said crystal and a second EMR port for receiving and directing radiation through said crystal whereby radiation will enter said first EMR port, propagate through said crystal and exit said second EMR port and via versa;

e) means to direct said fundamental beam and said second harmonic beam from second EMR port to said second reflective surface to reflect said fundamental and said second harmonic beams to said second EMR port for propagation back through said nonlinear crystal to produce additional second harmonic beam;

f) means to direct the EMR propagating from said first EMR port to a second harmonic beam separator;

g) said second harmonic beam separator in optical communication with said fist EMR port to separate said second harmonic beam from said fundamental beam;

h) means to direct the separated second harmonic beam outside said optical resonator cavity;

i) directing means to direct said fundamental beam back through said laser medium; and j) said first mirror in optical communication with EMR propagating from the back end of said laser medium to reflect said EMR back through said laser medium for amplification;

k) a first diode end pumping apparatus for pumping the front end of said laser medium;

l) said optical resonator cavity configured to impart laser beam diameter in the laser medium from about 0.8 mm to 2.0 mm in diameter for said fundamental beam;

m) said laser medium having a diameter from about 1.6 to 5 times said fundamental laser beam diameter.

37. The laser according to claim 36 further comprising a cooling jacket surrounding said laser medium so that said laser medium is directly water cooled.

38. The laser according to claim 36 wherein said second harmonic beam separator is a dichroic mirror which is highly reflective for second harmonic beam and highly transmissive for fundamental beam.

39. The laser according to claim 36 wherein said laser medium has a diameter from about 1.6 to 4.0 times said laser beam diameter.

40. The laser according to claim 39 wherein said optical resonator cavity is configured to operate at TEM00 mode.

41. The laser according to claim 40 further comprising a polarization discriminator located within said resonator cavity.

42. The laser according to claim 36 wherein said second harmonic generator is a second harmonic nonlinear crystal.

43. The laser according to claim 36 further comprising a second diode end pumping apparatus for pumping the back end of said laser medium.

44. The laser according to claim 36 wherein said laser crystal is a Nd doped laser crystal.

45. The laser according to claim 36 wherein said laser crystal is Nd:YAG doped at about 0.2% to about 0.8%.

46. The laser according to claim 45 further comprising said laser crystal has a length of at least 20 mm.

47. The laser according to claim 36 wherein said laser crystal is Nd:YAG doped at about 0.4% to about 0.6%.

48. The laser according to claim 36 wherein said laser crystal is Nd:YLF doped at about 0.3% to 0.8%.

49. The laser according to claim 48 further comprising laser crystal has a length of at least 20 mm.

50. The laser according to claim 36 wherein said laser crystal is Nd:YLF doped at about 0.4% to about 0.7%.

51. The laser according to claim 36 wherein said laser crystal is Nd:YVO$_4$ doped at about 0.1% to about 0.5%.

52. The laser according to claim 51 wherein said laser crystal has a length of at least 12 mm.

53. The laser according to claim 36 wherein said laser crystal is Nd:YVO$_4$ doped at about 0.2% to about 0.4%.

54. The laser according to claim 36 wherein the resonator length is about 22 cm to about 100 cm.

55. The laser according to claim 54 wherein the resonator length is about 35 cm to about 100 cm.

56. A laser for producing a third harmonic beam comprising
   a) a first reflective surface and a second reflective surface to form an optical resonator cavity therebetween;
      said optical resonator cavity having an optical axis between said first and second reflective surfaces;
   b) a laser medium located within said cavity for generating a fundamental frequency beam of electromagnetic radiation (EMR) having a first preselected wavelength propagating from the front end and the back end of said laser medium;
   c) a second harmonic generator for converting a portion of said EMR of said first preselected fundamental wavelength beam to a second harmonic beam in optical communication with said front end of said laser medium
   d) said second harmonic generator having a first EMR port for receiving and directing radiation through said generator and a second EMR port for receiving and directing radiation through said generator whereby radiation will enter said first EMR port, propagate through said generator and exit said second EMR port and via versa;
   e) means to direct said fundamental beam and said second harmonic beam from second EMR port to said second mirror to reflect said fundamental and sad second harmonic beams to said second EMR port for propagation back through said generator to produce additional second harmonic beam;
   f) means to direct the EMR propagating from said first EMR port to a third harmonic non-linear crystal;
   g) said third harmonic non-linear crystal having a third EMR port for receiving and directing radiation through said crystal and a fourth EMR port for receiving and directing radiation through said crystal whereby radiation will enter said third EMR port, propagate through said crystal and exit said fourth EMR port and vise versa whereby a portion of the fundamental and a portion of second harmonic beam are converted to a third harmonic beam;
   h) means to direct the EMR propagating from said fourth EMR port to a third harmonic beam separator;
   i) said third harmonic beam separator in optical communication with said fourth EMR port to separate said third harmonic beam from said fundamental beam;
   j) means to direct the separated third harmonic beam outside said optical resonator cavity;
   k) directing means to direct said fundamental beam back through said laser medium; and
   l) said first mirror in optical communication with EMR propagating from the back end of said laser medium to reflect said EMR back through said laser medium for amplification;
   m) a first diode end pumping apparatus for pumping the front end of said laser medium;
   n) said optical resonator cavity configured to impart a laser beam diameter in the laser medium from about 0.8 mm to 2.0 mm in diameter for said fundamental beam;
   o) said laser medium having a diameter from about 1.6 to 5 times said fundamental laser beam diameter.

57. The laser according to claim 56 wherein said third harmonic beam separator is a dichroic mirror which is highly reflective for third harmonic beam and highly transmissive for fundamental beam.

58. The laser according to claim 56 further comprising a cooling jacket surrounding said laser medium so that said laser medium is directly water cooled.

59. The laser according to claim 56 wherein said laser medium has a diameter from about 1.6 to 4.0 times said laser beam diameter.

60. The laser according to claim 59 wherein said cavity is configured to operate at TEM$_{00}$ mode.

61. The laser according to claim 60 further comprising a polarization discriminator located within said optical resonator cavity.

62. The laser according to claim 56 wherein said second harmonic generator is a second harmonic nonlinear crystal.

63. The laser according to claim 62 wherein said second harmonic nonlinear crystal is a type I crystal.

64. The laser according to claim 56 wherein said laser crystal is a Nd doped laser crystal.

65. The laser according to claim 56 wherein said laser crystal is Nd:YAG doped at about 0.2% to about 0.8%.

66. The laser according to claim 65 further comprising said laser crystal has a length of at least 20 mm.

67. The laser according to claim 56 wherein said laser crystal is Nd:YAG doped at about 0.4% to about 0.6%.

68. The laser according to claim 56 wherein said laser crystal is Nd:YLF doped at about 0.3% to 0.8%.

69. The laser according to claim 68 further comprising said laser crystal has a length of at least 20 mm.

70. The laser according claim 56 wherein said laser crystal is Nd:YLF doped at about 0.4% to about 0.7%.

71. The laser according to claim 56 wherein said laser crystal is Nd:YVO$_4$ doped at about 0.1 % to about 0.5%.

72. The laser according to claim 71 wherein said laser crystal has a length of at least 12 mm.

73. The laser according to claim 56 through wherein said laser crystal is Nd:YVO$_4$ doped at about 0.2% to about 0.4%.

74. The laser according to claim 56 wherein the optical resonator cavity length is about 22 cm to about 100 cm.

75. The laser according to claim 56 wherein the resonator length is about 35 cm to about 100 cm.

76. The laser according to claim 56 further comprising a second diode end pumping apparatus for pumping the back end of said laser medium.

77. A fourth harmonic laser comprising;
   a) a first reflective surface and a second reflective surface to form an optical resonator cavity therebetween;
      said optical resonator cavity having an optical axis between said first and second reflective surfaces;
   b) a laser medium located within said cavity for generating a fundamental frequency beam of electromagnetic radiation (EMR) having a first preselected wavelength propagating from the front end and the back end of said laser medium;

c) a second harmonic generator for converting a portion of said EMR of said first preselected fundamental frequency beam to a second harmonic beam in optical communication with said front end of said laser medium;

d) said second harmonic generator having a it EMR port for receiving and directing radiation through said generator and a second EMR port for receiving and directing radiation through said generator whereby radiation will enter said first EMR port, propagate through said crystal and exit said second EMR port and vise versa;

e) means to direct said fundamental beam to said first EMR port;

f) means to direct said fundamental beam propagating from said second ERM port to said second reflective surface and said second harmonic beam propagating from second EMR port to a second harmonic reflective surface so that said fundamental and said second harmonic beams are reflected to said second EMR port for propagation back through said second harmonic generator to produce additional second harmonic beam prior to any conversion of second harmonic beam to a higher harmonic beam;

g) means to direct the EMR propagating from said first EMR port to a third harmonic generator;

h) said third harmonic generator including a third harmonic generation nonlinear crystal having a third EMR port for receiving and directing radiation through said crystal and a fourth EMR port for receiving and directing radiation through said crystal whereby radiation will enter said third EMR port, propagate through said crystal and exit said fourth EMR port and vise versa whereby a portion of the fundamental and a portion of second harmonic beam are converted to a third harmonic beam;

i) means to direct the EMR propagating from said fourth EMR port to a fourth harmonic generator;

j) said fourth harmonic generator including a fourth harmonic generation nonlinear crystal having a fifth EMR port for receiving and directing radiation through said crystal and a sixth EMR port for receiving and directing radiation through said crystal whereby radiation will enter said fifth EMR port, propagate through said crystal and exit said sixth EMR port and vise versa whereby a portion of the fundamental and a portion of third harmonic beams are converted to a fourth harmonic beam;

k) a fourth harmonic beam separator in optical communication with said sixth EMR port to separate said fourth harmonic beam from said fundamental beam;

l) means to direct the separated fourth harmonic beam outside said optical resonator cavity;

m) directing means to direct said fundamental beam back through said laser medium.

n) a first diode end pumping apparatus for pumping the front end of said laser medium;

o) said optical resonator cavity configured to impart laser beam diameter in the laser medium from about 0.8 mm to 2.0 mm in diameter for said fundamental beam p) said laser medium having a diameter from about 1.6 to 5 times said fundamental laser beam diameter.

78. The laser according to claim 77 wherein said laser medium has a diameter from about 1.6 to 4.0 times said laser beam diameter.

79. The laser according to claim 77 further comprising a cooling jacket surrounding said laser medium so that said laser medium is directly water cooled.

80. The laser according to claim 77 wherein said optical resonator cavity is configured to operate at TEM$_{00}$ mode.

81. The laser according to claim 77 further comprising a polarization discriminator located within said optical resonator cavity.

82. The laser according to claim 77 wherein said second harmonic generator is a second harmonic nonlinear crystal.

83. The laser according to claim 77 wherein said second harmonic nonlinear crystal is a type I.

84. The laser according to claim 77 wherein said laser crystal is a Nd doped laser crystal.

85. The laser according to claim 77 wherein said laser crystal is Nd:YAG doped at about 0.2% to about 0.8%.

86. The laser according to claim 85 further comprising said laser crystal has a length of at least 20 mm.

87. The laser according to claim 77 wherein said laser crystal is Nd:YAG doped at about 0.4% to about 0.6%.

88. The laser according to claim 77 wherein said laser crystal is Nd:YLF doped at about 0.3% to 0.8%.

89. The laser according to claim 88 further comprising said laser crystal has a length of at least 20 mm.

90. The laser according to claim 77 wherein said laser crystal is Nd:YLF doped at about 0.4% to about 0.7%.

91. The laser according to claim 77 wherein said laser crystal is Nd:YVO$_4$ doped at about 0.1% to about 0.5%.

92. The laser according to claim 91 wherein said laser crystal has a length of at least 12 mm.

93. The laser according to claim 77 wherein said laser crystal is Nd:YVO$_4$ doped at about 0.2% to about 0.4%.

94. The laser according to claim 77 wherein the optical resonator cavity length is about 22 cm to about 100 cm.

95. The laser according to claim 77 wherein the optical resonator cavity length is about 35 cm to about 100 cm.

96. The laser according to claim 77 further comprising a second diode end pumping apparatus for pumping the back end of said laser medium.

* * * * *